United States Patent
Wudy et al.

(10) Patent No.: US 12,104,684 B2
(45) Date of Patent: Oct. 1, 2024

(54) ELECTRONIC LOCKING DIFFERENTIAL ASSEMBLY WITH WIRE GUIDE AND COVER

(71) Applicant: Eaton Intelligent Power Limited, Dublin (IE)

(72) Inventors: Jeremy Wudy, Burlington, MI (US); Mark Shewchuck, Charlotte, MI (US); Jeffrey Oesch, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/263,963

(22) PCT Filed: Feb. 4, 2022

(86) PCT No.: PCT/EP2022/025042
§ 371 (c)(1),
(2) Date: Aug. 2, 2023

(87) PCT Pub. No.: WO2022/171361
PCT Pub. Date: Aug. 18, 2022

(65) Prior Publication Data
US 2024/0093770 A1 Mar. 21, 2024

Related U.S. Application Data
(60) Provisional application No. 63/147,329, filed on Feb. 9, 2021.

(51) Int. Cl.
*F16H 57/037* (2012.01)
*B60K 17/16* (2006.01)
*F16H 48/34* (2012.01)

(52) U.S. Cl.
CPC ............ *F16H 48/34* (2013.01); *B60K 17/16* (2013.01); *F16H 57/037* (2013.01)

(58) Field of Classification Search
CPC .... F16H 48/00–2048/426; B60K 17/16–17/20
See application file for complete search history.

(56) References Cited

U.S. PATENT DOCUMENTS

| | | | | |
|---|---|---|---|---|
| 2,459,870 A | * | 1/1949 | Cook | ............... F16H 48/22 475/236 |
| 6,582,336 B2 | * | 6/2003 | Forrest | ............... F16H 48/295 475/150 |

(Continued)

FOREIGN PATENT DOCUMENTS

| | | | | |
|---|---|---|---|---|
| CN | 112825377 A | * | 5/2021 | ............... B60K 1/04 |
| JP | H0714229 U | * | 3/1995 | |

(Continued)

OTHER PUBLICATIONS

International Search Report and Written Opinion for Application No. PCT/EP2022/025042 mailed May 20, 2022.

*Primary Examiner* — Sherry L Estremsky
(74) *Attorney, Agent, or Firm* — Merchant & Gould P.C.

(57) ABSTRACT

A differential assembly includes an outer differential carrier and a differential case disposed in the outer differential carrier. A ring gear is attached to the differential case using fasteners. An electronic actuation mechanism locks and unlocks the differential assembly. The electronic actuation mechanism includes a stator positioned in a stator housing and an armature. A wire harness is connected to the stator supplying electrical power to the stator. A wire guide is attached to the stator housing. The wire guide includes an attachment section attached to the stator housing and an anti-rotation section. The anti-rotation section contacts the outer differential carrier. The anti-rotation section includes a wire receiving portion positioning the wire harness in an area away from the ring gear and fasteners. A removable (Continued)

cover is attached to the differential assembly, the removable cover is positioned about the electronic actuation mechanism and wire harness.

16 Claims, 12 Drawing Sheets

(56) References Cited

U.S. PATENT DOCUMENTS

| | | | | |
|---|---|---|---|---|
| 7,051,857 | B2 * | 5/2006 | Babin | F16H 48/34 |
| | | | | 137/539.5 |
| 7,131,201 | B2 * | 11/2006 | Morgensai | F16H 48/22 |
| | | | | 29/434 |
| 7,211,020 | B2 * | 5/2007 | Gohl | F16H 48/08 |
| | | | | 475/231 |
| 7,353,927 | B2 * | 4/2008 | Park | F16H 48/30 |
| | | | | 192/85.02 |
| 10,173,525 | B2 * | 1/2019 | Kamitani | B60K 17/165 |
| 2005/0103557 | A1 | 5/2005 | Duncan | |
| 2015/0133254 | A1 | 5/2015 | Fox | |
| 2023/0382222 | A1 * | 11/2023 | Rapp | F16H 48/24 |

FOREIGN PATENT DOCUMENTS

| | | | | |
|---|---|---|---|---|
| JP | 2008008459 | A | * | 1/2008 |
| JP | 4195534 | B2 | * | 12/2008 |
| KR | 20080050343 | A | * | 6/2008 |
| WO | WO-2020088801 | A1 | * | 5/2020 |
| WO | 2020/144090 | A1 | | 7/2020 |

* cited by examiner

ELECTRONIC LOCKING DIFFERENTIAL ASSEMBLY WITH WIRE GUIDE AND COVER

CROSS REFERENCE TO RELATED APPLICATIONS

This application is a National Stage Application of PCT/EP2022/025042, filed on Feb. 4, 2022, which claims the benefit of U.S. Patent Application Ser. No. 63/147,329, filed on Feb. 9, 2021, the disclosures of which are incorporated herein by reference in their entireties. To the extent appropriate, a claim of priority is made to each of the above disclosed applications.

FIELD OF THE INVENTION

The invention relates to wire guides and covers for an electronic locking differential assembly.

BACKGROUND OF THE INVENTION

Often a wire harness for a locking differential may be positioned near a rotating axle component due to packaging restrictions associated with a vehicle. There is a need for a wire harness that maintains an adequate distance from the rotating components. Further, there is a need for a wire harness that has adequate slack to prevent wire fatigue or damage in an assembly process. It would therefore be desirable to have a wire guide that positions the wire harness.

Differential assemblies may be partially assembled by a manufacturer and then sent for final assembly with a vehicle. During the shipping of the differential to an assembly location, there is a need to protect the wire harness and electronic components during shipping and also during the assembly process. It would therefore be desirable to have a cover protect the wire harness and electronic components.

SUMMARY OF THE INVENTION

In one aspect, there is disclosed a differential assembly including an outer differential carrier and a differential case disposed in the outer differential carrier. A ring gear is attached to the differential case using fasteners. An electronic actuation mechanism is operatively connected to the differential assembly locking and unlocking the differential assembly. The electronic actuation mechanism includes a stator positioned in a stator housing and an armature. A wire harness is connected to the stator supplying electrical power to the stator. A wire guide is attached to the stator housing. The wire guide includes an elongated body having an attachment section attached to the stator housing and an anti-rotation section separated from the attachment section. The anti-rotation section contacts the outer differential carrier. The anti-rotation section includes a wire receiving portion positioning the wire harness in an area away from the ring gear and fasteners.

In another aspect, there is disclosed a differential assembly including an outer differential carrier and a differential case disposed in the outer differential carrier. A ring gear is attached to the differential case using fasteners. An electronic actuation mechanism is operatively connected to the differential assembly locking and unlocking the differential assembly. The electronic actuation mechanism includes a stator positioned in a stator housing and an armature. A wire harness is connected to the stator supplying electrical power to the stator. A wire guide is attached to the stator housing. The wire guide includes an elongated body having an attachment section attached to the stator housing and an anti-rotation section separated from the attachment section. The anti-rotation section contacts the outer differential carrier. The anti-rotation section includes a wire receiving portion positioning the wire harness in an area away from the ring gear and fasteners. A removable cover is attached to the differential assembly, the removable cover is positioned about the electronic actuation mechanism and wire harness.

DETAILED DESCRIPTION OF THE PREFERRED EMBODIMENTS

Referring to FIGS. 1-7, there is shown a differential assembly 10 that includes an electronic actuation mechanism 12. The electronic actuation mechanism 12 includes a stator 14 that is positioned in a stator housing 16. The stator 14 acts on an armature 18 to lock and unlock the differential assembly 10. Axial movement of the armature 18 is transferred through a retaining ring 21 to a lock plate (not shown) locking and unlocking the differential assembly 10. The stator 14 includes a wire harness 20 connected therewith for supplying electrical power to the stator 14.

Figure 2:
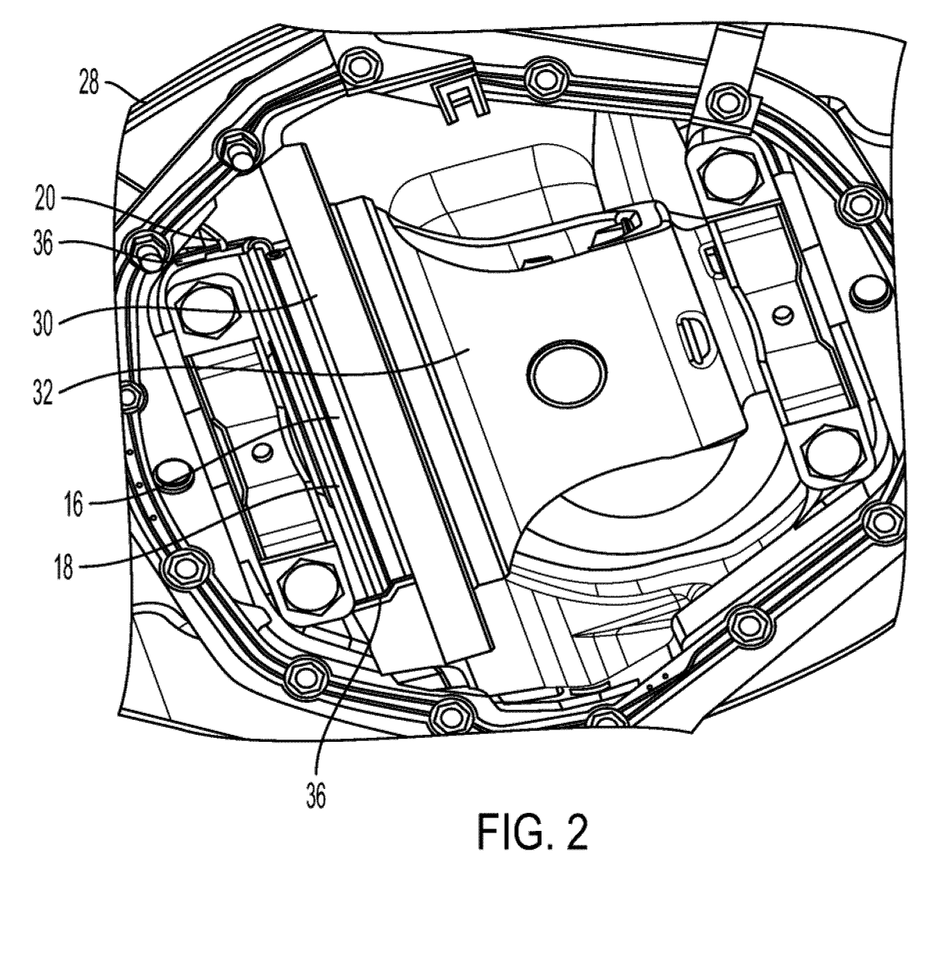
FIG. 2 is a partial perspective view of a differential assembly including a wire guide.

The wire harness 20 includes opposing ends with a first end 22 attached to the stator 14 and a second end 24 that is coupled to a power source (not shown). The wire harness 20 may include a grommet 26 that seals the wire harness 20 as it passes through an outer differential carrier 28 as best shown in FIG. 2.

The differential assembly 10 includes a ring gear 30 that is attached to the differential case 32 using fasteners 34. The ring gear 30 and differential case 32 rotate when the differential assembly 10 is in operation. There is a need to prevent the wire harness 20 from becoming caught on the fasteners 34 as the ring gear 30 rotates.

A wire guide 36 is attached to the stator housing 16, and receives the wire harness 20, and directs the wire harness 20 away from the fasteners 34 of the ring gear 30. The wire guide 36 includes an elongated body 38 that includes an attachment section 40 separated from an anti-rotation section 42. The attachment section 40 is attached to the stator housing 16. The anti-rotation section 42 is separated from the attachment section 40 by an angled portion 44 that angles outward from the attachment section 40 and then transitions back to a straight angle. The anti-rotation section 42 contacts the outer differential carrier 28 to prevent rotation of the stator housing 16 and stator 14, best seen in FIG. 2.

The wire guide 36 includes a wire-receiving portion 46 that grips the wire harness 20 and prevents movement of the wire harness 20 towards the ring gear fasteners 34. The wire-receiving portion 46 may have various shapes and sizes as denoted in the embodiments of FIGS. 1-3 and the embodiment of FIG. 4. The wire-receiving portion 46 may be formed or attached to the anti-rotation section 42. The size of the wire-receiving portion 46 is slightly smaller relative to the outside diameter of the wire harness 20 so that the wire harness 20 is frictionally retained to prevent movement of the wire harness 20. In one aspect, a second wire guide 37 may be attached to the stator housing 16 and does not include a wire receiving portion 46, but rather acts only as an anti-rotation structure.

Figure 1:
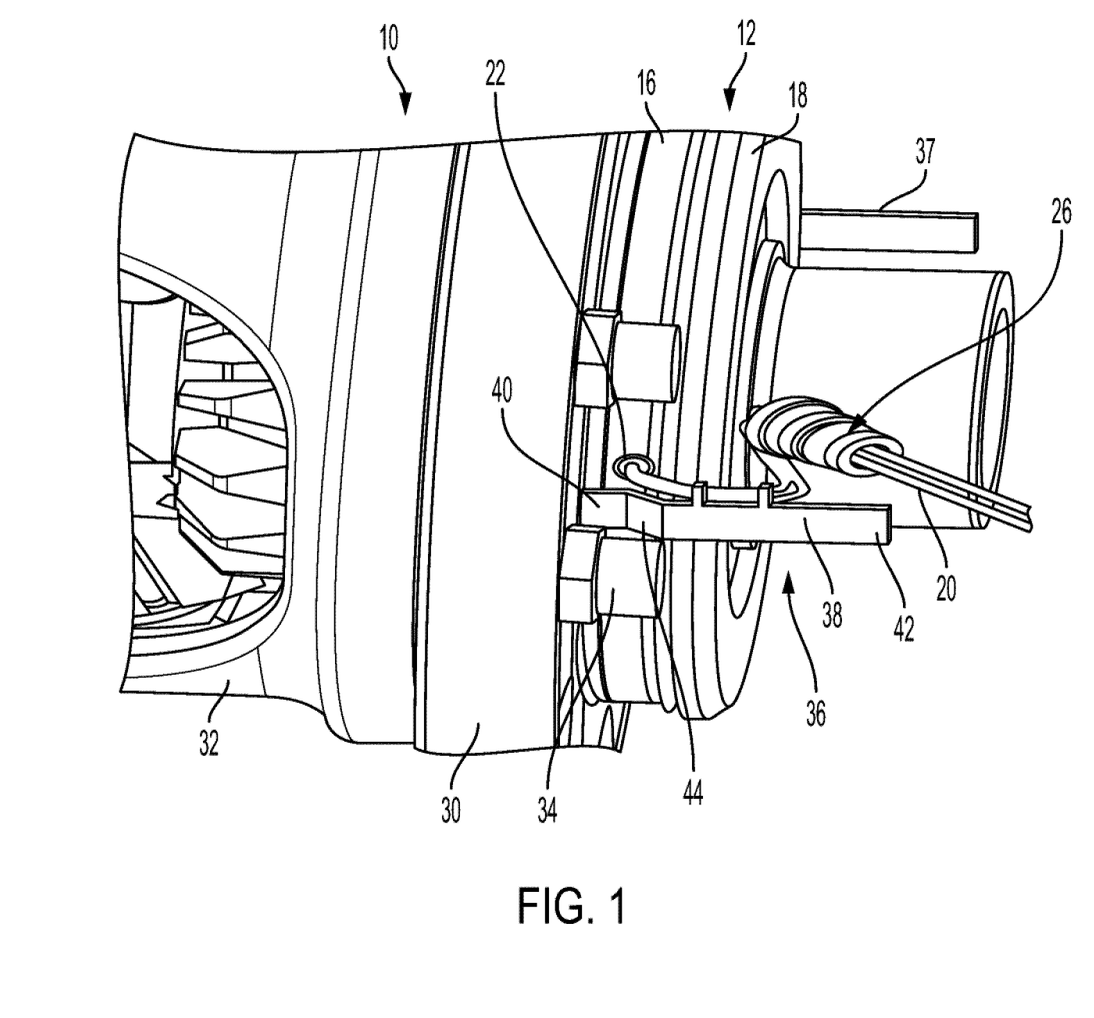
FIG. 1 is a partial perspective view of a differential assembly including a wire guide.
Figure 3:
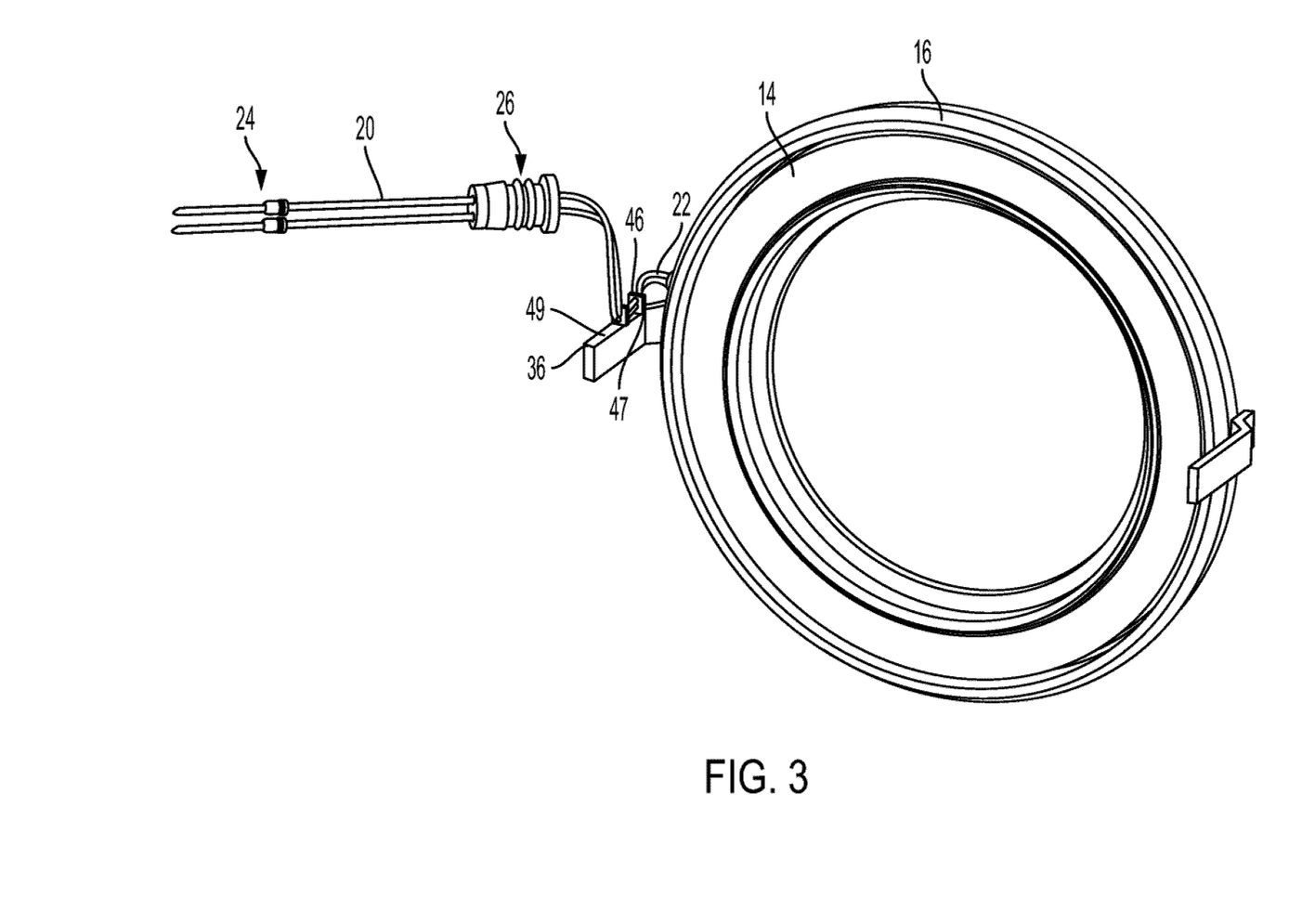
FIG. 3 is a partial perspective view of a stator and wire harness and a wire guide.

In the embodiment shown in FIGS. 1 and 3, the wire receiving portion 46 may include at least one passage 47 formed on an edge 49 of the anti-rotation section 42, with two passages 47 being shown.

Figure 4:
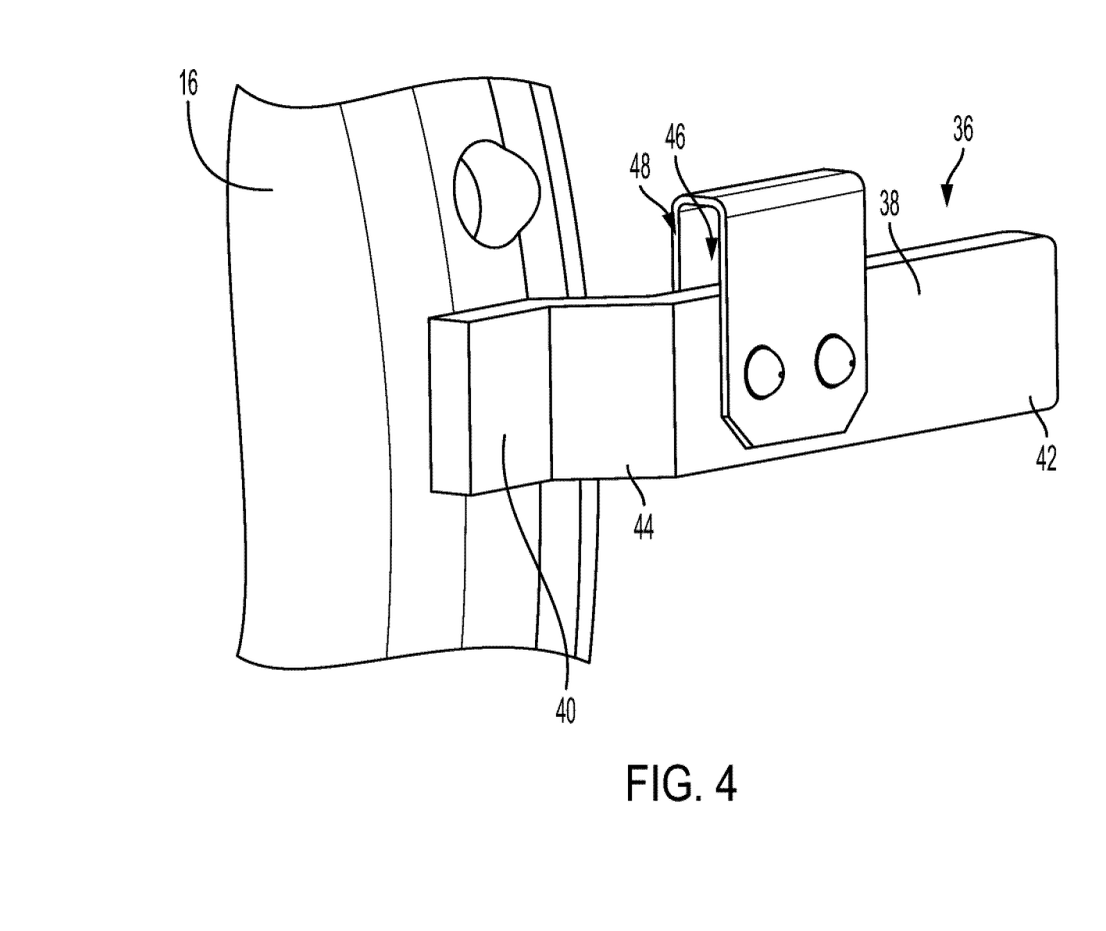
FIG. 4 is a partial perspective view of a wire guide attached to a stator housing.
Figure 5:
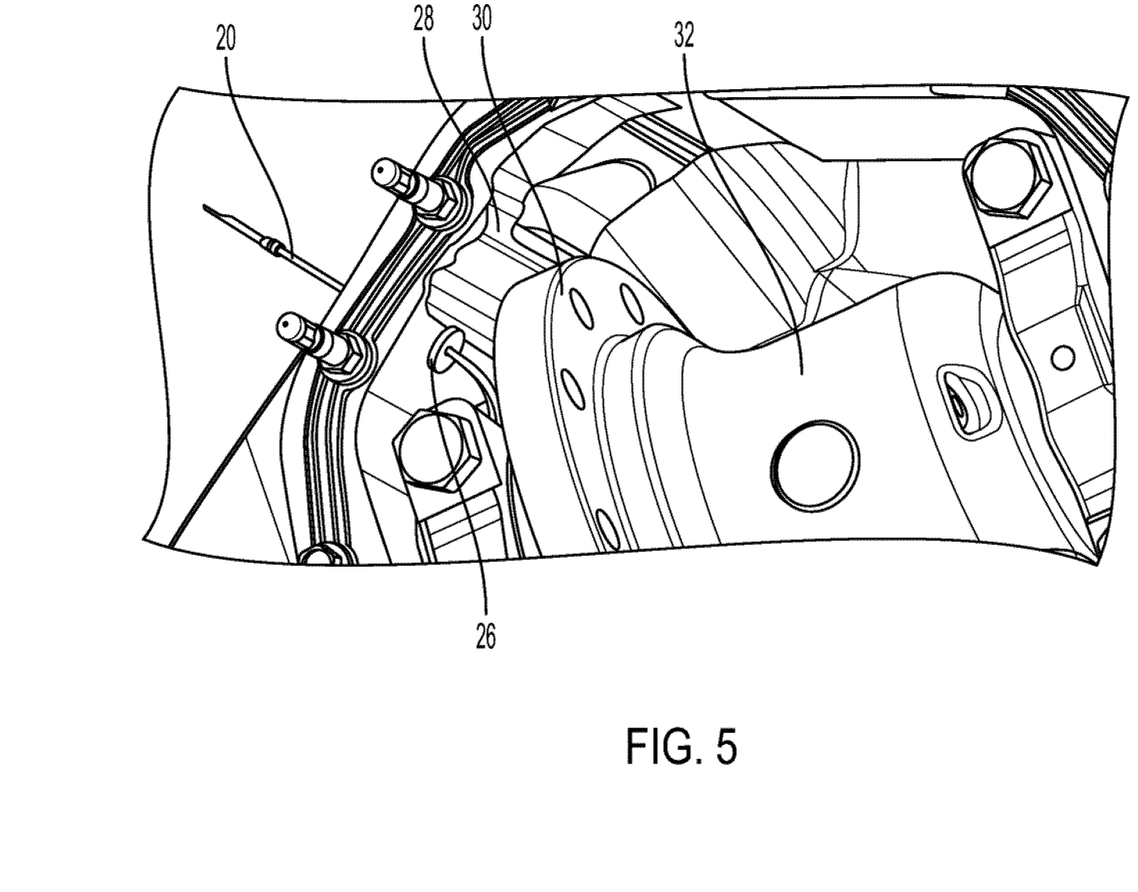
FIG. 5 is a partial perspective view of a differential assembly showing a grommet attachment and passage of a wire harness through an outer carrier.

In the depicted embodiment of FIG. 4, the wire-receiving portion 46 is shown as a U-shaped profile 48 that is attached to the anti-rotation section 42. The wire receiving portion 46 positions the slack in the wire harness 20 in an area away from the ring gear 30 and fasteners 34 allowing a simplified assembly of the wire harness 20 into the differential assembly. The slack also allows for preventing fatigue of the wire harness 20 or damage of the wire harness 20 during an assembly process.

Figure 6:
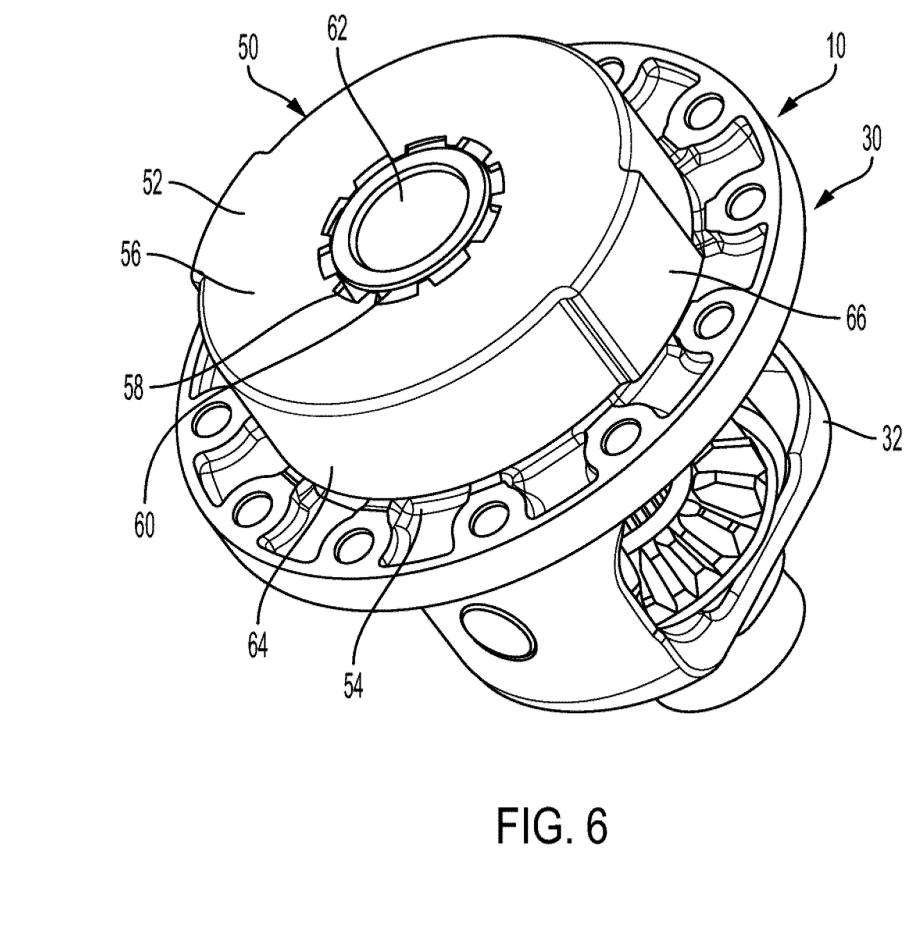
FIG. 6 is a partial perspective view of a differential assembly including a cover.
Figure 7:
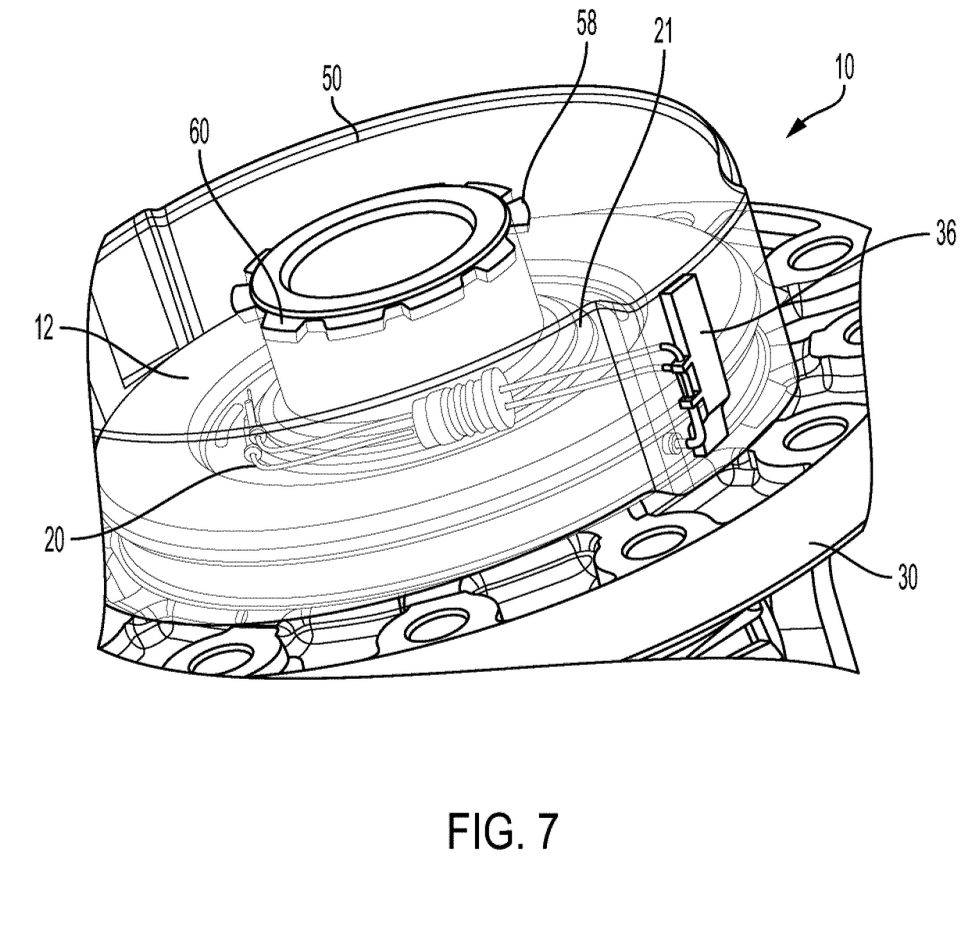
FIG. 7 is a partial perspective view of a differential assembly including a cover in phantom showing the wire guide.

Referring to FIGS. 6 and 7, there is shown a removable cover 50 that may be attached to the differential assembly 10 when it is shipped and assembled and then removed when finally attached to a vehicle. The cover 50 includes a generally cylindrical shaped body 52 that has an open end 54 that is positioned about the electronic actuation mechanism 12. The opposing end 56 of the cylindrical body 52 includes a series of teeth shaped openings 58 formed in the end surface that receive teeth 60 formed on a hub 62 of the ring gear 30. The contact of the teeth shaped openings 58 with the teeth 60 provides a friction fit to retain the cover 50 in position. The sidewall 64 of the cylindrical shaped body 52 includes two protrusions 66 formed thereon that accommodate the wire guides 36 described above.

In use, the cover 50 may be positioned about the electronic actuation mechanism 12 with the wire harness 20 positioned therein as shown in FIG. 7. The friction fit of the teeth shaped openings 58 with the teeth 60 attaches the cover 50 securely for shipping to an assembly plant. When the ring gear 30 is attached to the differential assembly 10 usually in an automated process, the cover 50 is still attached and prevents damage to the wire harness 20 and electronic actuation mechanism 12 when the differential assembly 10 is assembled. After assembly, the cover 50 may be removed before attachment of the differential assembly 10 to a vehicle.

Figure 8:
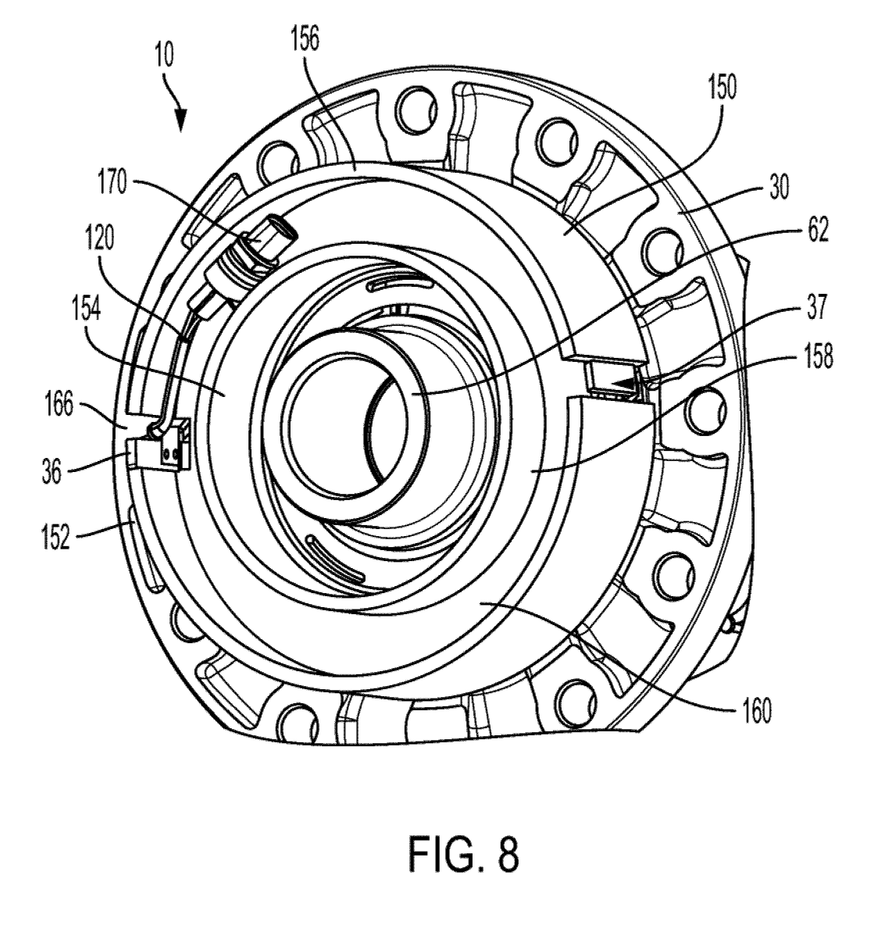
FIG. 8 is a partial perspective view of a differential assembly including an alternative cover.
Figure 9:
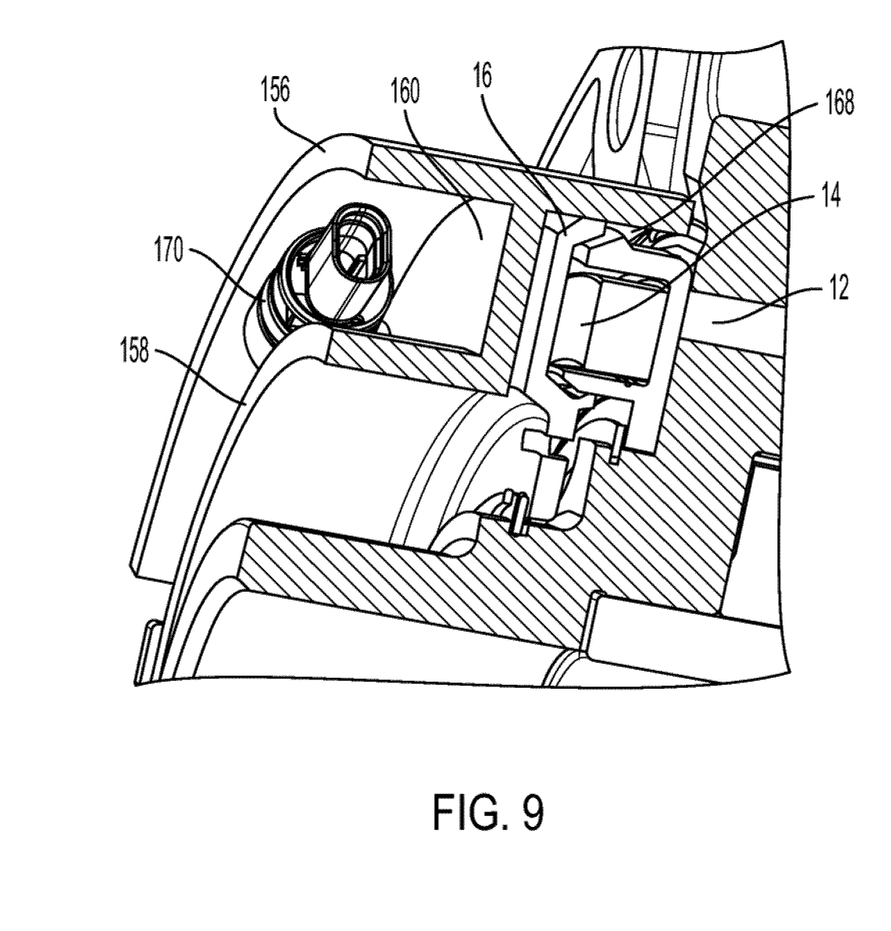
FIG. 9 is a partial sectional view of a differential assembly including an alternative cover.
Figure 10:
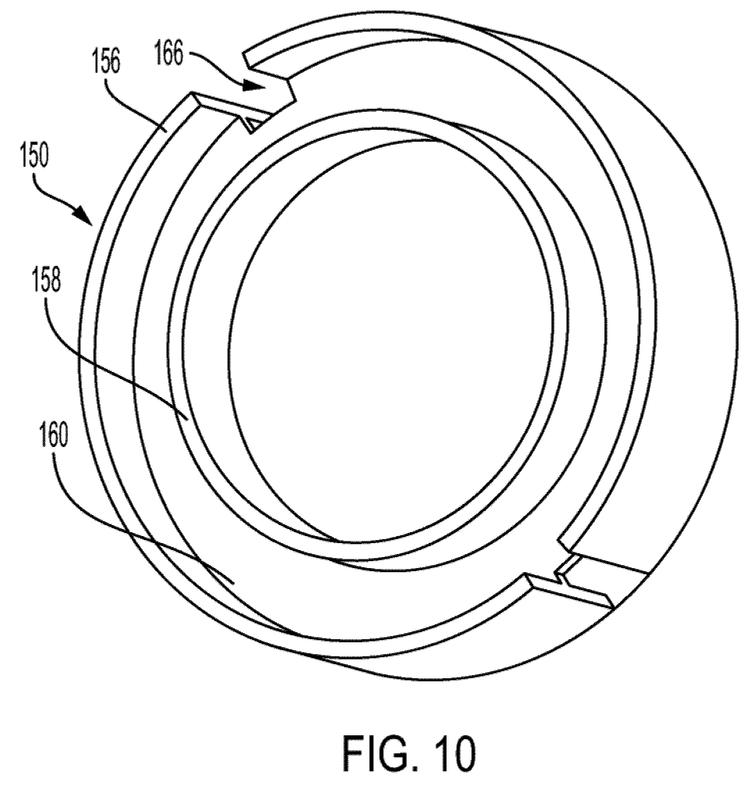
FIG. 10 is a perspective view of an alternative cover.

Referring to FIGS. 8-10 there is shown a removable cover 150 that may be attached to the differential assembly 10 when it is shipped and assembled and then removed when finally attached to a vehicle. The cover 150 includes a generally ring-shaped shaped body 152 that has an opening 154 accommodating a hub 62 of the ring gear 30. The ring-shaped shaped body 152 includes an outer wall 156 separated radially from an inner wall 158 to define a connector cavity 160. The outer wall 156 is connected to the inner wall 158 by a base wall 160. The ring-shaped body 152 is positioned about the electronic actuation mechanism 12.

The outer wall 156 includes a pair of notches 166 formed therein that accommodate the wire guides 36, 37 described above.

As best seen in FIG. 9, the outer wall 156 extends from the base wall 160 to cover the stator housing 16. The inner diameter 168 of the outer wall 156 engages in a friction fit with the stator housing 16 to removably attach the cover 150 to the differential assembly 10.

In the depicted embodiment, the wire harness 120 includes opposing ends with a first end 122 attached to a bulk head fitting 170 and a second end 124 that is coupled to a power source (not shown). The depicted wire harness 120 does not require a grommet 26 as described above with respect to FIG. 4.

In one aspect, the bulk head fitting 170 may be retained in the connector cavity 160 during shipping and assembly. The radial distance between the outer wall 156 and the inner wall 158 may be selected such that the bulk head fitting is retained frictionally in the connector cavity 160.

In use, the cover 150 may be positioned about the electronic actuation mechanism 12 with the wire harness 120 positioned therein, as shown in FIG. 8. The friction fit of the outer wall 156 with the stator housing 16 attaches the cover 150 securely for shipping to an assembly plant. When the ring gear 30 is attached to the differential assembly 10 usually in an automated process, the cover 150 is still attached and prevents damage to the wire harness 120 and electronic actuation mechanism 12 when the differential assembly 10 is assembled. After assembly, the cover 150 may be removed before attachment of the differential assembly 10 to a vehicle.

Figure 11:
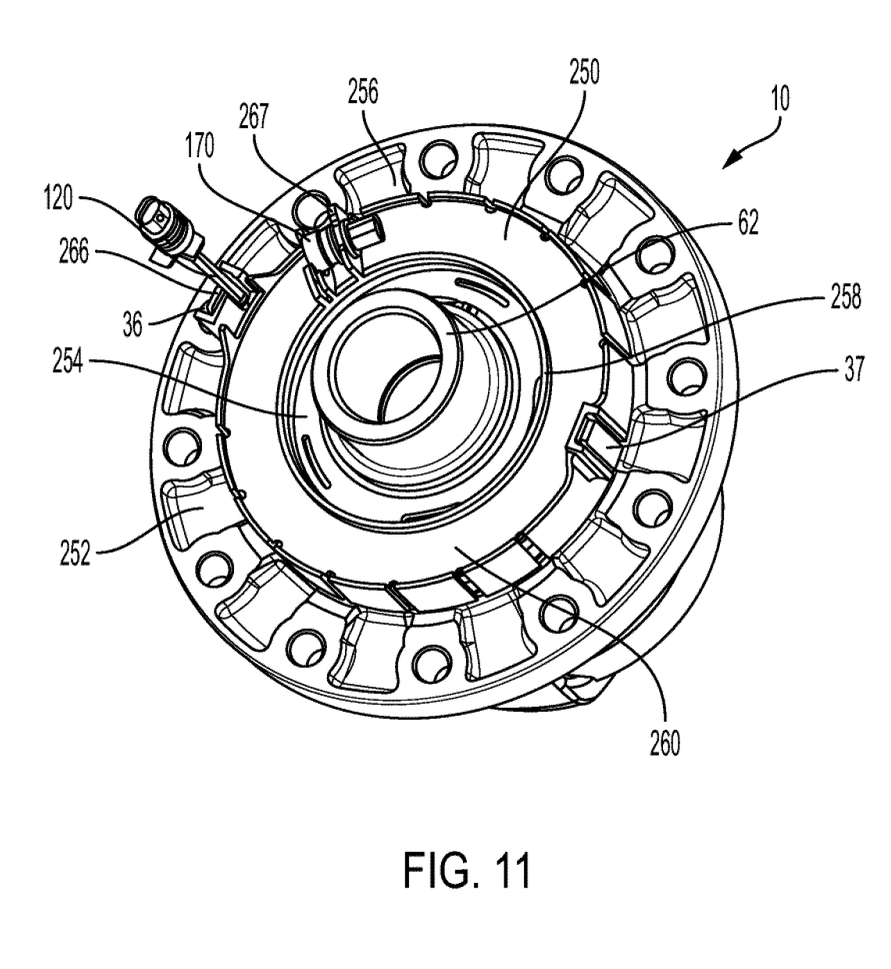
FIG. 11 is a partial perspective view of a differential assembly including another alternative cover.
Figure 12:
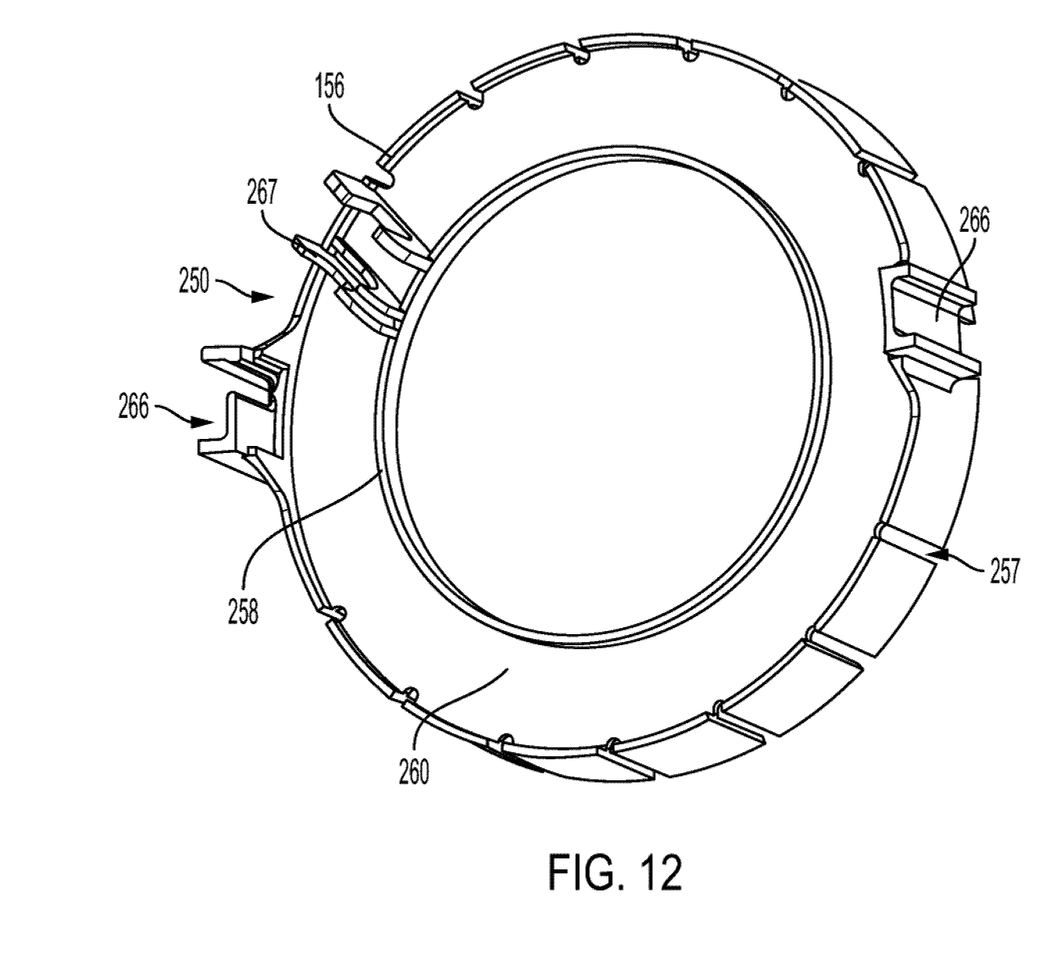
FIG. 12 is a perspective view of the alternative cover of FIG. 11.

Referring to FIGS. 11 and 12, there is shown an alternative structure of a removable housing 250. The removable housing is similar to the embodiment of FIGS. 8-10 and includes a generally ring-shaped shaped body 252 that has an opening 254 accommodating a hub 62 of the ring gear 30. The ring-shaped shaped body 252 includes an outer wall 256 separated radially from an inner wall 258 to define a connector cavity 260. The outer wall 256 is connected to the inner wall 258 by a base wall 260. The ring-shaped body 252 is positioned about the electronic actuation mechanism 12.

The outer wall 256 of the depicted embodiment of FIGS. 11 and 12 has a lower overall height in comparison to the embodiment of FIGS. 8-10. The outer wall also includes slots 257 formed therein. The outer wall 256 includes a pair of notches 266 formed therein that accommodate the wire guides 36, 37 described above. In the depicted embodiment of FIGS. 11 and 12, a retainer structure 267 is disposed in the connector cavity 260 to retain the bulk head fitting 170.

In use, the cover 250 may be positioned about the electronic actuation mechanism 12 with the wire harness 120 positioned therein, as shown in FIG. 11. The friction fit of the outer wall 256 with the stator housing 16 attaches the cover 250 securely for shipping to an assembly plant. When the ring gear 30 is attached to the differential assembly 10 usually in an automated process, the cover 250 is still attached and prevents damage to the wire harness 120 and electronic actuation mechanism 12 when the differential assembly 10 is assembled. After assembly, the cover 250 may be removed before attachment of the differential assembly 10 to a vehicle.

The invention claimed is:

1. A differential assembly comprising:
an outer differential carrier;
a differential case disposed in the outer differential carrier;
a ring gear attached to the differential case using fasteners;
an electronic actuation mechanism operatively connected to the differential assembly locking and unlocking the differential assembly, the electronic actuation mechanism including a stator positioned in a stator housing and an armature;
a wire harness connected to the stator supplying electrical power to the stator;
a wire guide attached to the stator housing, the wire guide including an elongated body having an attachment section attached to the stator housing and an anti-rotation section separated from the attachment section, the anti-rotation section contacting the outer differential carrier, the anti-rotation section including a wire receiving portion positioning the wire harness in an area away from the ring gear and fasteners.

2. The differential assembly of claim 1 wherein the wire receiving portion includes a size smaller relative to an outside diameter of the wire harness frictionally retaining the wire harness.

3. The differential assembly of claim 1 wherein the wire receiving portion includes at least one passage formed on an edge of the anti-rotation section.

4. The differential assembly of claim 1 wherein the wire receiving portion includes a U-shaped profile attached to the anti-rotation section.

5. The differential assembly of claim 1 wherein the anti-rotation section is separated from the attachment section by an angled portion that angles outward from the attachment section and then transitions back to a straight angle.

6. A differential assembly comprising:
an outer differential carrier;
a differential case disposed in the outer differential carrier;
a ring gear attached to the differential case using fasteners;
an electronic actuation mechanism operatively connected to the differential assembly locking and unlocking the differential assembly, the electronic actuation mechanism including a stator positioned in a stator housing and an armature;
a wire harness connected to the stator supplying electrical power to the stator;
a wire guide attached to the stator housing, the wire guide including an elongated body having an attachment section attached to the stator housing and an anti-rotation section separated from the attachment section, the anti-rotation section contacting the outer differential carrier, the anti-rotation section including a wire receiving portion positioning the wire harness in an area away from the ring gear and fasteners and;
a removable cover attached to the differential assembly, the removable cover positioned about the electronic actuation mechanism and wire harness.

7. The differential assembly of claim 6, wherein the removable cover includes a generally cylindrical shaped body having an open end that is positioned about the electronic actuation mechanism and an opposing end of the cylindrical body includes a series of teeth shaped openings formed in an end surface that receive teeth formed on a hub of the ring gear defining a friction fit.

8. The differential assembly of claim 7, wherein a sidewall of the cylindrical body includes protrusions formed thereon that accommodate the wire guides.

9. The differential assembly of claim 6, wherein the removable cover includes a generally ring-shaped shaped body that has an opening accommodating a hub of the ring gear.

10. The differential assembly of claim 9 wherein the ring-shaped shaped body includes an outer wall separated radially from an inner wall to define a connector cavity, the outer wall is connected to the inner wall by a base wall.

11. The differential assembly of claim 10 wherein the outer wall includes a pair of notches formed therein that accommodate the wire guides.

12. The differential assembly of claim 10 wherein the outer wall extends from the base wall covering the stator housing and wherein an inner diameter of the outer wall engages in a friction fit with the stator housing to removably attach the cover to the differential assembly.

13. The differential assembly of claim 10 wherein the wire harness includes a bulk head fitting attached to a first end of the wire harness.

14. The differential assembly of claim 13 wherein a radial distance between the outer wall and the inner wall is selected such that the bulk head fitting is retained frictionally in the connector cavity.

15. The differential assembly of claim 13 including a retainer structure disposed in the connector cavity retaining the bulk head connector.

16. A differential assembly comprising:
an outer differential carrier;
a differential case disposed in the outer differential carrier;
a ring gear attached to the differential case using fasteners;
an electronic actuation mechanism operatively connected to the differential assembly locking and unlocking the differential assembly, the electronic actuation mechanism including a stator positioned in a stator housing and an armature;
a wire harness connected to the stator supplying electrical power to the stator;
a wire guide attached to the stator housing, the wire guide including an elongated body having an attachment section attached to the stator housing, an anti-rotation section, and a third portion, the anti-rotation section separated from the attachment section by the third portion, the anti-rotation section contacting the outer differential carrier, the anti-rotation section including a wire receiving portion positioning the wire harness in an area away from the ring gear and fastener.

* * * * *